(12) United States Patent
Anderson et al.

(10) Patent No.: US 8,510,253 B2
(45) Date of Patent: Aug. 13, 2013

(54) METHOD AND APPARATUS FOR SUGGESTING A USER ACTIVITY

(75) Inventors: Marko Anderson, Helsinki (FI); Marco Paglia, San Francisco, CA (US)

(73) Assignee: Nokia Corporation, Espoo (FI)

( * ) Notice: Subject to any disclaimer, the term of this patent is extended or adjusted under 35 U.S.C. 154(b) by 1028 days.

(21) Appl. No.: 12/483,547

(22) Filed: Jun. 12, 2009

(65) Prior Publication Data
US 2010/0318491 A1 Dec. 16, 2010

(51) Int. Cl.
*G06F 17/20* (2006.01)
*G06F 17/30* (2006.01)

(52) U.S. Cl.
USPC .......................................................... 706/52

(58) Field of Classification Search
USPC .......................................................... 706/52
See application file for complete search history.

(56) References Cited

U.S. PATENT DOCUMENTS
2009/0177977 A1* 7/2009 Jones et al. .................... 715/753

* cited by examiner

*Primary Examiner* — Jeffrey A Gaffin
*Assistant Examiner* — Nathan Brown, Jr.
(74) *Attorney, Agent, or Firm* — Ditthavong Mori & Steiner P.C.

(57) ABSTRACT

In accordance with an example embodiment of the present invention, an apparatus comprises at least one processor and at least one memory. The at least one memory includes computer program code. Further, the at least one memory and the computer program code configured to, with the at least one processor, cause the apparatus to perform at least the following obtain first activity data from a user; receive second activity data from one or more groups; compare first and second activity data; indicate difference between the first and second activity data; and suggest at least one activity to a user based at least in part on the indicated difference between first and second activity data.

14 Claims, 4 Drawing Sheets

METHOD AND APPARATUS FOR SUGGESTING A USER ACTIVITY

RELATED APPLICATIONS

This application relates to U.S. application Ser. No. 12/431,740, titled "METHOD AND APPARATUS FOR SHARING CONTENT TO ONE OR MORE USERS", filed Apr. 28, 2009, which is hereby incorporated by reference in its entirety.

TECHNICAL FIELD

The present application relates generally to suggesting a user activity.

BACKGROUND

An electronic device may have a user interface to access content. Further, there may be different types of user interfaces. As such, the electronic device facilitates use of content using different types of user interfaces.

SUMMARY

Various aspects of examples of the invention are set out in the claims.

According to a first aspect of the present invention, an apparatus comprises at least one processor and at least one memory. The at least one memory includes computer program code. Further, the at least one memory and the computer program code configured to, with the at least one processor, cause the apparatus to perform at least the following obtain first activity data from a user; receive second activity data from one or more groups; compare flit and second activity data; indicate difference between the first and second activity data; and suggest at least one activity to a user based at least in part on the indicated difference between first and second activity data.

According to a second aspect of the present invention, a method comprises obtaining first activity data from a user; receiving second activity data from one or more groups; comparing first and second activity data; indicating difference between the first and second activity data; and suggesting at least one activity to a user based at least in part on the indicated difference between first and second activity data.

According to a third aspect of the present invention, an apparatus comprises at least one processor and at least one memory. The at least one memory includes computer program code. Further, the at least one memory and the computer program code configured to, with the at least one processor, cause the apparatus to perform at least the following receive a suggestion to join at least one group based at least on a user's activity and send an acceptance to join the at least one group from a user related to the user's activity. Further, a user interface is configured to display activity data associated with the at least one group.

According to a fourth aspect of the present invention, a method comprises receiving a suggestion to join at least one group based at least on a user's activity from a remote electronic device; sending an acceptance to join the at least one group from a user related to the user's activity from a user of an electronic device; and displaying activity data associated with the at least one group on the electronic device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7 of the drawings.

Figure 1:
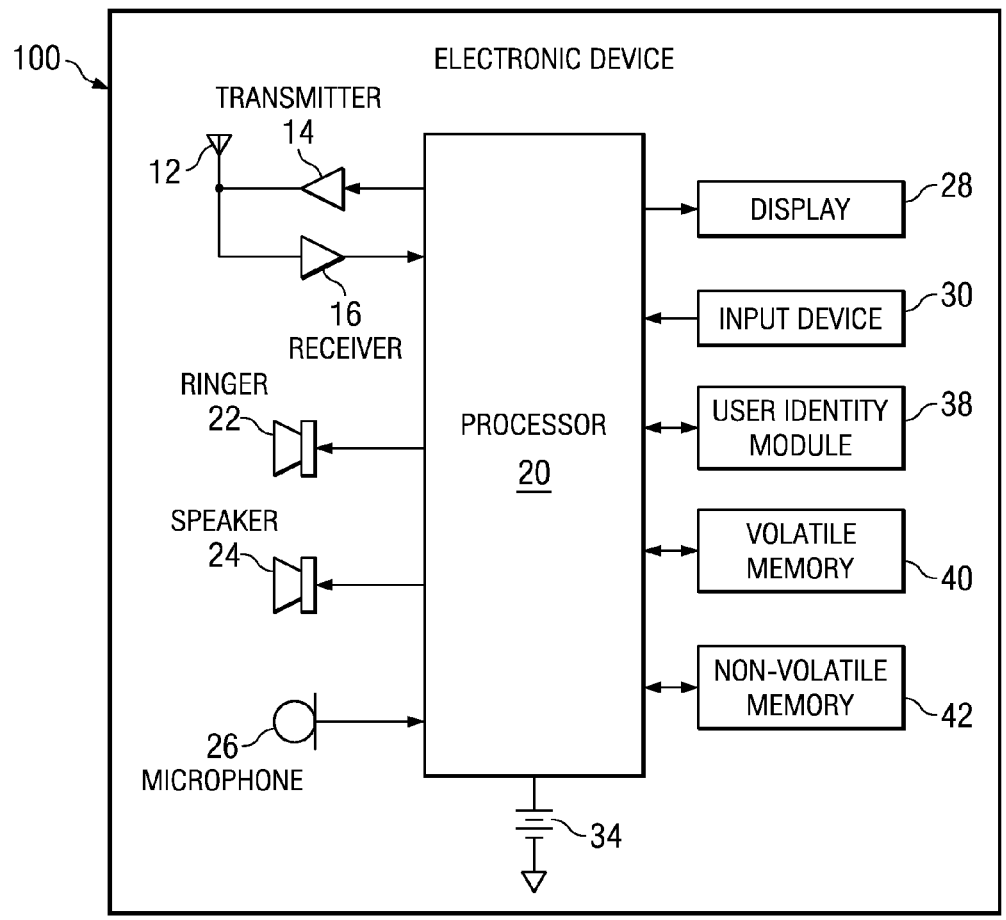
FIG. 1 is a block diagram depicting an electronic device operating in accordance with an example embodiment of the invention.

FIG. 1 is a block diagram depicting an electronic device 100 operating in accordance with an example embodiment of the invention. In an example embodiment, an electronic device 100 comprises at least one antenna 12 in communication with a transmitter 14, a receiver 16, and/or the like. The electronic device 100 may further comprise a processor 20 or other processing component. In an example embodiment, the electronic device 100 may comprises multiple processors, such as processor 20. The processor 20 may provide at least one signal to the transmitter 14 and may receive at least one signal from the receiver 16. In an embodiment, the electronic device 100 may also comprise a user interface comprising one or more input or output devices, such as a conventional earphone or speaker 24, a ringer 22, a microphone 26, a display 28, and/or the like. In an embodiment, an input device 30 comprises a mouse, a touch screen interface, a pointer, and/or the like. In an embodiment, the one or more output devices of the user interface may be coupled to the processor 20. In an example embodiment, the display 28 is a touch screen, a liquid crystal display, an electronic ink, and/or the like.

In an embodiment, the electronic device 100 may also comprise a battery 34, such as a vibrating battery pack, for powering various circuits to operate the electronic device 100. Further, the vibrating battery pack may also provide mechanical vibration as a detectable output. In an embodiment, the electronic device 100 may further comprise a user identity module (UIM) 38. In one embodiment, the UIM 38 may be a memory device comprising a processor. The UIM 38 may comprise, for example, a subscriber identity module (SIM), a universal integrated circuit card (UICC), a universal subscriber identity module (USIM), a removable user identity module (R-UIM), and/or the like. Further, the UIM 38 may store one or more information elements related to a subscriber, such as a mobile subscriber.

In an embodiment, the electronic device 100 may comprise memory. For example, the electronic device 100 may comprise volatile memory 40, such as random access memory (RAM). Volatile memory 40 may comprise a cache area for the temporary storage of data. Further, the electronic device 100 may also comprise non-volatile memory 42, which may be embedded and/or may be removable. The non-volatile memory 42 may also comprise an electrically erasable programmable read only memory (EEPROM), flash memory, and/or the like. In an alternative embodiment, the processor 20 may comprise memory. For example, the processor 20 may comprise volatile memory 40, non-volatile memory 42, and/or the like.

In an embodiment, the electronic device 100 may use memory to store any of a number of pieces of information and/or data to implement one or more features of the electronic device 100. Further, the memory may comprise an identifier, such as international mobile equipment identification (IMEI) code, capable of uniquely identifying the electronic device 100. The memory may store one or more instructions for determining cellular identification information based at least in part on the identifier. For example, the processor 20, using the stored instructions, may determine an identity, e.g., cell id identity or cell id information, of a communication with the electronic device 100.

In an embodiment, the processor 20 of the electronic device 100 may comprise circuitry for implementing audio feature, logic features, and/or the like. For example, the processor 20 may comprise a digital signal processor device, a microprocessor device, a digital to analog convener, other support circuits, and/or the like. In an embodiment, control and signal processing features of the processor 20 may be allocated between devices, such as the devices describe above, according to their respective capabilities. Further, the processor 20 may also comprise an internal voice coder and/or an internal data modem. Further still, the processor 20 may comprise features to operate one or more software programs. For example, the processor 20 may be capable of operating a software program for connectivity, such as a conventional Internet browser. Further, the connectivity program may allow the electronic device 100 to transmit and receive Internet content, such as location-based content, other web page content, and/or the like. In an embodiment, the electronic device 100 may use a wireless application protocol (WAP), hypertext transfer protocol (HTTP), file transfer protocol (FTP) and/or the like to transmit and/or receive the Internet content.

In an embodiment, the electronic device 100 may be capable of operating in accordance with any of a number of a first generation communication protocol, a second generation communication protocol, a third generation communication protocol, a fourth generation communication protocol, and/or the like. For example, the electronic device 100 may be capable of operating in accordance with second generation (2G) communication protocols IS-136, time division multiple access (TDMA), global system for mobile communication (GSM), IS-95 code division multiple access (CDMA), and/or the like. Further, the electronic device 100 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further still, the electronic device 100 may also he capable of operating in accordance with 3.9 generation (3.9G) wireless communication protocols, such as Evolved Universal Terrestrial Radio Access Network (E-UTRAN) or the like, or wireless communication projects, such as long term evolution (LTE) or the like. Still further, the electronic device 100 may be capable of operating in accordance with fourth generation (4G) communication protocols.

In an alternative embodiment, the electronic device 100 may be capable of operating in accordance with a non-cellular communication mechanism. For example, the electronic device 100 may be capable of communication in a wireless local area network (WLAN), other communication networks, and/or the like. Further, the electronic device 100 may communicate in accordance with techniques, such as radio frequency (RF), infrared (IrDA), any of a number of WLAN techniques. For example, the electronic device 100 may communicate using one or more of the following WLAN techniques: IEEE 802.11, e.g., 802.11a, 802.11b, 802.11g, 802.11n, and/or the like. Further, the electronic device 100 may also communicate, via a world interoperability, to use a microwave access (WiMAX) technique, such as IEEE 802.16, and/or a wireless personal area network (WPAN) technique, such as IEEE 802.15, BlueTooth (BT), ultra wideband (UWB), and/or the like.

It should be understood that the communications protocols described above may employ the use of signals. In an example embodiment, the signals comprises signaling information in accordance with the air interface standard of the applicable cellular system, user speech, received data, user generated data, and/or the like. In an embodiment, the electronic device 100 may be capable of operating with one or more air interface standards, communication protocols, modulation types, access types, and/or the like. It should be further understood that the electronic device 100 is merely illustrative of one type of electronic device that would benefit from embodiments of the invention and, therefore, should not be taken to limit the scope of embodiments of the invention.

While embodiments of the electronic device 100 are illustrated and will be hereinafter described for purposes of example, other types of electronic devices, such as a portable digital assistant (PDA), a pager, a mobile television, a gaming device, a camera, a video recorder, an audio player, a video player, a radio, a mobile telephone, a traditional computer, a portable computer device, a global positioning system (GPS) device, a GPS navigation device, a GPS system, a mobile computer, a browsing device, an electronic book reader, a combination thereof, and/or the like, may be used. While several embodiments of the invention may be performed or used by the electronic device 100, embodiments may also be employed by a server, a service, a combination thereof, and/or the like.

Figure 2:
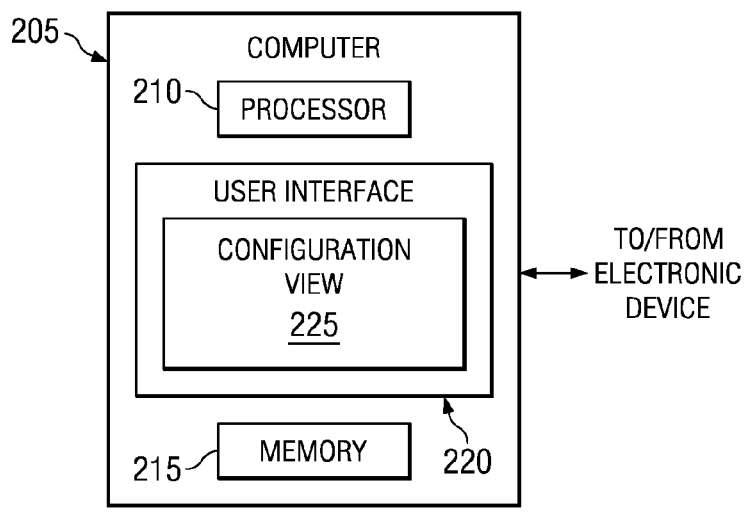
FIG. 2 is a block diagram depicting a computer operating in accordance with an example embodiment of the invention.

FIG. 2 is a block diagram depicting a computer 205 operating in accordance with an example embodiment of the invention. In an example embodiment, the computer 205 comprises at least one processor 210, at least one memory 215 and/or a user interface 220. Further, the computer 205 may be in communication with an electronic device. In an embodiment, the processor 210 comprises at least one memory 215. The at least one memory 215 may comprise computer program code. In an example embodiment, the at least one memory 215 comprises computer program code. In an embodiment, the computer program code is configured to, with the at least one processor, cause the computer 205 to perform at least the following obtain first activity data from a user; receive second activity data from one or more groups; compare first and second activity data; indicate difference between the first and second activity data; and suggest at least one activity to a user based on the indicated difference between first and second activity data. In an alternative embodiment, the at least one memory 215 may be separate from the processor 210.

In an example embodiment, the activity data is at least one of the following: contextual recommendations, a mobile number, a name, a short message service contact, a multimedia messaging service contact, an email address, a chat identifier, a location, an Internet protocol address, an Inter service provider, a voice over Internet protocol client, user profile information, media files, music piece, playlist, purchasing habit, position data, one or more shared files, combination thereof, and/or the like. In an example embodiment, location may comprise landmarks, areas, streets, cities, countries, and/or the like. In an embodiment, music may comprise music artist, music album, music song, and/or the like. In an example embodiment, a movie may comprise a movie director, movie title, television programs, and/or the like. In an embodiment, an event may comprise an event organizer and/or the like. It should be understood that activity data may be any data and the above example embodiment above is not meant to be limiting.

In an embodiment, the user interface 220 is configured to display a configuration view 225. The configuration view 225 may be used to manage activity data. In an example embodiment, the activity data is at least one of the following: shared, public, anonymous, or private. In an embodiment, shared relates to activity data available to users within one or more groups. In an example embodiment, the one or more groups are dynamic. For example, the one or more groups are adding and removing users in real time. In an embodiment, private relates to activity data available to a particular user, such as a first-person user. In an embodiment, public relates to activity data openly available to all users of a service. In an embodiment, public users are people who have or have not registered for the particular service, accessing the activity data via another service, and/or the like. Public activity data is typically identifiable to one or more users. In an embodiment, Anonymous relates to activity data, which is created and viewed in aggregate. Anonymous activity data is generally not identifiable to a particular user, one or more users, a group, and/or the like.

In an example embodiment, any number of configurations for managing contextual relationship of people related to activity data may be employed. Some examples configurations may be at least one of the following: "Me", "We", "You", "All", "World", and/or the like. Example configurations provide a framework to determine the activity data interface/view, the actionable items and/or presented metadata, the experience path to more activity data, and/or the like. Some example activity data types may include events, social activities, locations/places, media, things, and/or the like. A technical effect of one or more of the example embodiments disclosed herein is managing contextual relationship of people related to activity data.

In an example embodiment, a "Me" configuration refers to activity data related to a first-person user. The activity data may be Private, Shared or Public. In an embodiment, the activity data based on the first-person user and/or the dynamics with the activity data. For example, the activity data relates to a single user and/or the updates within the activity data, e.g., a new event.

In an example embodiment, a "We" configuration refers to activity data related to a specific set of users. In an example embodiment, the activity data is shared. In an embodiment, the activity data includes the dynamics between a first-person user, other group users, the activity data, and/or the like.

In an example embodiment, a "You" configuration refers to activity data related a specific user, other than, for example, a first-person user. In an embodiment, the activity data may be shared, public, and/or the like. In an embodiment, a connection may have been previously made with a "You" user or the connection may be publicly available activity data. In an example embodiment, the activity data is the shared dynamics between the two or more users and the activity data.

In an example embodiment, an "All" configuration refers to a view into the activity data from each user of a particular service. In an embodiment, the activity data is public. In an example embodiment, the activity data shares dynamics between a first-person user, each of the other service users, the activity data, and/or the like.

In an example embodiment, a "World" configuration refers to a view into the activity data from each users of a particular service. In an embodiment, the activity data is anonymous. In an embodiment, the activity data shares dynamics between a first-person user, each of the other service users of the service, the activity data, and/or the like. In an embodiment, the activity data is relates to trends, statistics, and/or the like, as opposed to another user.

In an example embodiment, at least one of the one or more groups is related to a single user having shared or unshared activity data. In an embodiment, at least one of the one or more groups is related to multiple users having shared activity data. In an embodiment, at least one of the one or more groups is related to each user associated with a service. In an embodiment, at least one of the one or more groups is at least one of the following: private, shared, or public. Other sharing configurations are also possible.

Figure 3:
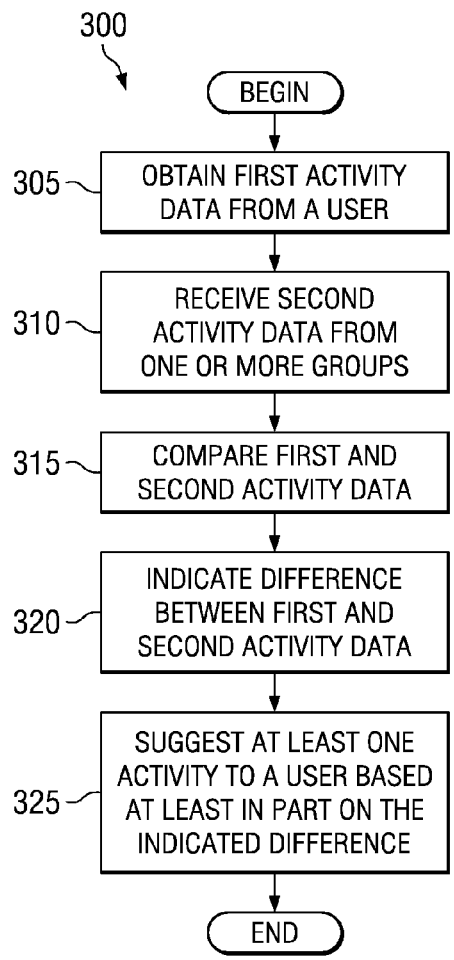
FIG. 3 is a flow diagram illustrating an example method to suggest at least one activity in accordance with an example embodiment of the invention.

FIG. 3 is a flow diagram illustrating an example method 300 to suggest at least one activity in accordance with an example embodiment of the invention. Example method 300 may be performed by a computer, such as computer 205 of FIG. 2.

At 305, it is activity data is obtained from a user. In an embodiment, the processor of the computer, such as processor 210 of FIG. 2, comprises at least one memory. The at least one memory may comprise computer program code. In an example embodiment, the at least one memory comprises computer program code. In an embodiment, the computer program code is configured to, with the at least one processor, cause the computer to perform at least the following obtain first activity data from a user. For example, the processor obtains activity data relating to, for example, a musical artist, to make a suggestion for other activity data.

At 310, second activity data is received from one or more groups. In an example embodiment, the processor receives second activity data from one or more groups. For example, the processor receives activity data related to the groups and first data.

At 315, compare first and second activity data. In an example embodiment, the processor compares the first and second activity data. For example, the processor compares the musical artist.

At 320, indicate difference between the first and second activity data. In an example embodiment, the processor indicates a difference between the first and second activity data. For example, the user has been listening to the music artist and the processor compares the user's listening with a group, which has been listening to that artist as well. In such a case, the processor may suggest other artists associated with the group to the user using, for example, collaborative filtering patterns.

In another embodiment, a user is visiting a website to watch a movie and the processor compares how much the user visits the website overall against a group, which has been visiting that website as well. In such a case, the processor proposes the user other websites, which are selected according to collaborative filtering patterns. Further, a user may have been to a location and the processor compares how often the user visits this location as opposed to a group, which has been to the location. In such a case, the processor proposes the user visit other locations, which are selected according to collaborative filtering patterns.

At 325, suggest at least one activity to a user based on the indicated difference between first and second activity data suggest at least one of the one or more groups to a user based at least on a user's activity. In an example embodiment, the processor suggests at least one activity of the one or more groups to a user based at least on a user's activity. For example, the processor suggests visiting a location similar to a location at least one group visits based on the location of the user.

Figure 4:
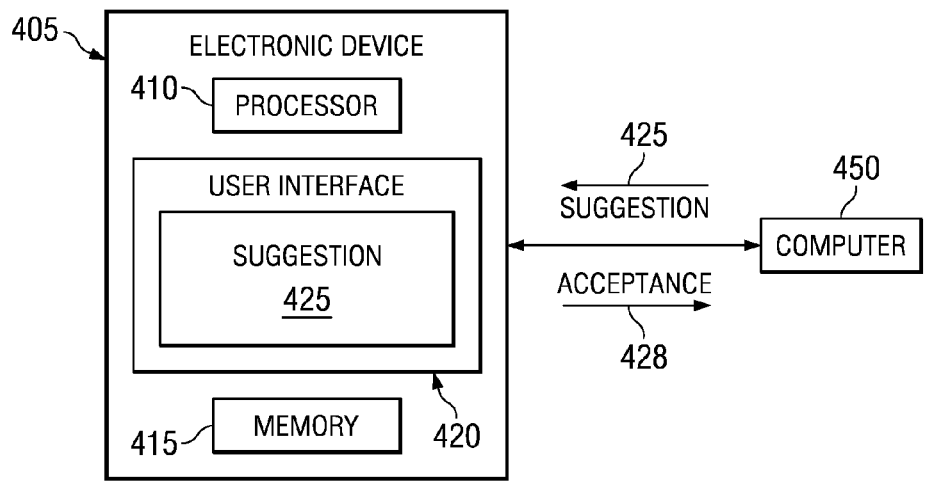
FIG. 4 is a block diagram depicting an electronic device operating in accordance with an example embodiment of the invention.

FIG. 4 is a block diagram depicting an electronic device 405 operating in accordance with an example embodiment of the invention. In an example embodiment, the electronic device 405 comprises at least one processor 410, at least one memory 415 and/or a user interface 420. In an example embodiment, the electronic device 405 may be in communication with a computer 450. In an example embodiment, computer 450 is similar to computer 205 of FIG. 2. In an alternative embodiment, computer 450 is different than computer 205 of FIG. 2.

In an example embodiment, the memory 415 comprises computer program code. In an embodiment, the computer program code is configured to, with the at least one processor 410, cause the electronic device 405 to perform at least the following receive a suggestion to join at least one group based at least on a user's activity and receive an acceptance to join the at least one group from a user related to the user's activity.

In an example embodiment, the processor 410 of the electronic device 405 receives a suggestion to join at least one group based at least on a user's activity. For example, the processor 410 receives a suggestion to join at least one group from a computer, such a computer 205 of FIG. 2, a service, and/or the like. In such a case, the processor may receive a suggestion 422 to join a group or use a configuration, such as "you" and/or the like. The user interface 420 is configured to display the suggestion 425. In an embodiment, the user accepts a suggestion 425, via the user interface 420, and the processor sends an acceptance 428 to, for example, the computer 450.

In an example embodiment, the user interface 420 is configured to display activity data associated with the at least one group. For example, a user views the activity data associated with each of the added groups. A technical effect of one or more of the example embodiments disclosed herein is allowing acceptance of a suggestion to join at least one group.

Figure 5:
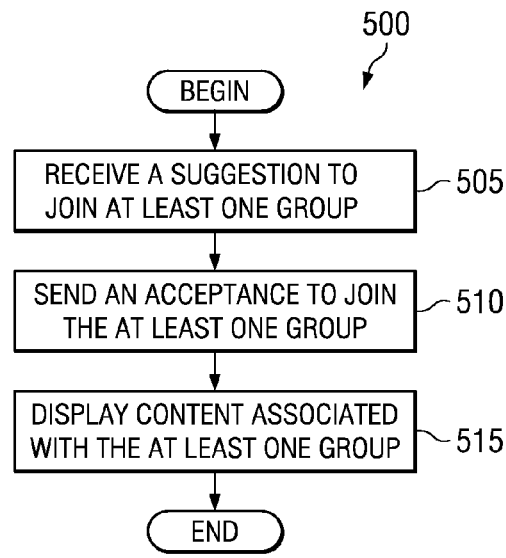
FIG. 5 is a flow diagram illustrating an example method to receive a suggestion to join a group in accordance with an example embodiment of the invention.

FIG. 5 is a flow diagram illustrating an example method 500 to receive a suggestion to join a group in accordance with an example embodiment of the invention. Example method 500 may be performed by an electronic device, such as electronic device 405 of FIG. 4.

At 505, a suggestion to join at least one group is received. In an example embodiment, a processor, such as processor 410 of the electronic device, receives a suggestion, such as suggestion 425 of FIG. 4, to join at least one group based at least on a user's activity. For example, the processor receives a suggestion to join at least one group from a computer, such a computer 205 of FIG. 2, a service, and/or the like.

At 510, the acceptance to join at least one group is sent. In an example embodiment, the processor is configured to send an acceptance of the suggestion. In such a case, the user accepts a suggestion, via the user interface, and the processor sends an acceptance, such as acceptance 428 of FIG. 4, to, for example, a computer, such as computer 450.

At 515, a user interface, such as user interface 420 of FIG. 4, is configured to display activity data associated with the at least one group. For example, a user views the activity data associated with each of the added groups using the user interface.

Figure 6:
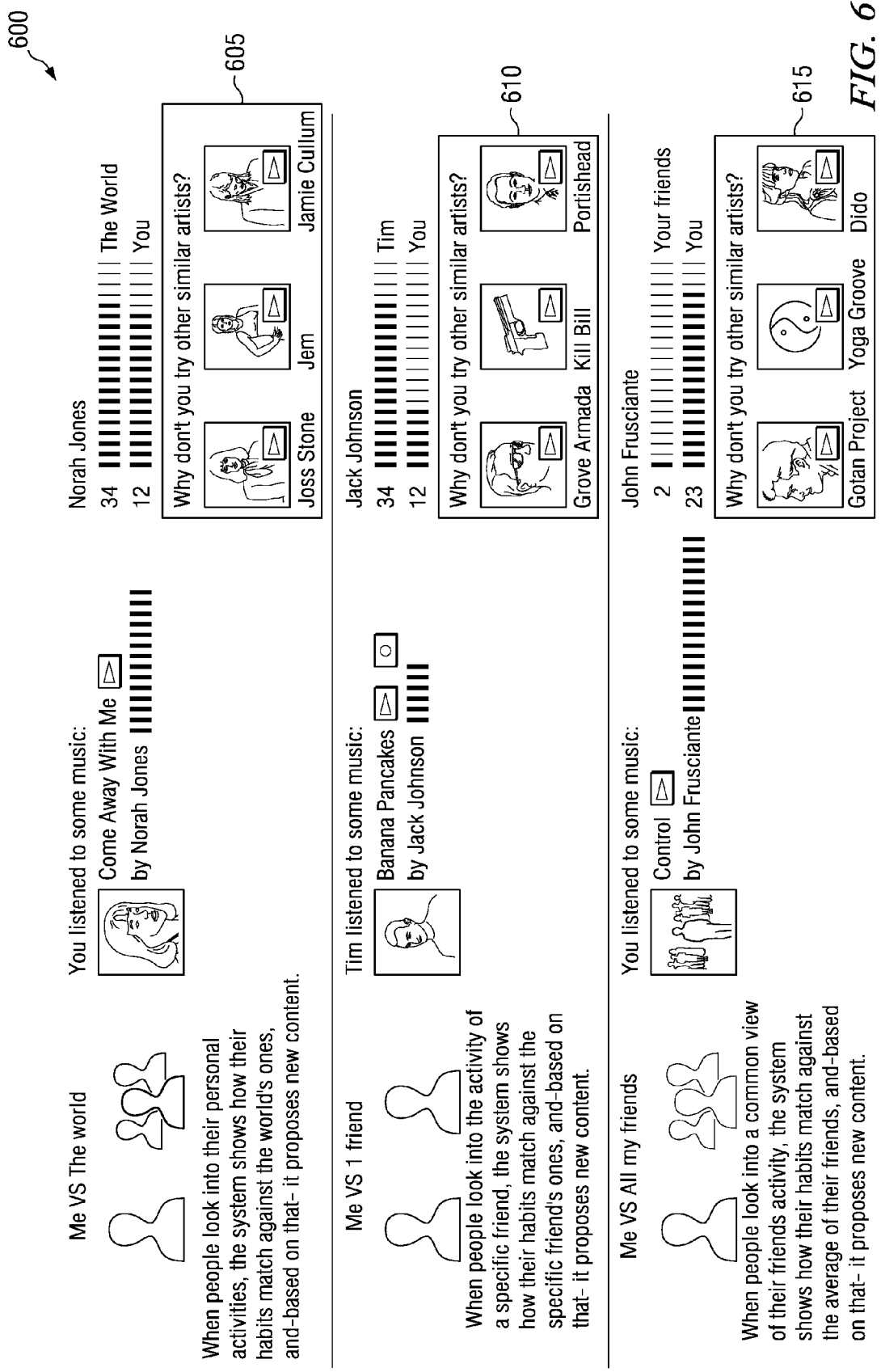
FIG. 6 is a screen view depicting suggestions to join at least one group on an electronic device.

FIG. 6 is a screen view 600 depicting suggestions 605, 610, 615 to join at least one group on an electronic device. In an example embodiment, screen view 600 is displayed by an electronic device, such as electronic device 405.

In an example embodiment, the screen view 600 depicts suggestions 605, 610, 615 to a user based at least in part on the user's activity in different configurations. For example, suggestion 605 is a "Me" vs. the "World" configuration suggesting artist based on the user's activity and what others in the "World" group are listening to. Further, suggestions 610, 615 recommend other artists based on different groups, such as "1 Friend" or all "Friends" of the user. In these examples, the user may accept any of the suggestions 605, 610, 615 to enjoy the benefits of the suggested group. In an embodiment, one of the suggestions 605, 610, 615 of content is presented to the user. In an example embodiment, at least one suggestion of the suggestions 605, 610, 615 of content is different as compared to different services, e.g. data existing in a service website and/or the like.

Figure 7:
FIG. 7 is a screen view depicting a configuration view in accordance with an example embodiment of the invention.
Figure 7:
Figure 7:
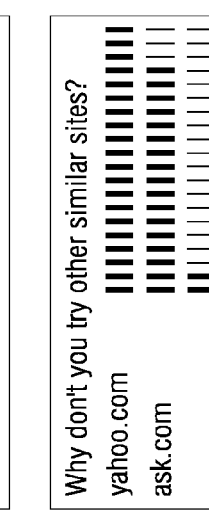
Figure 7:
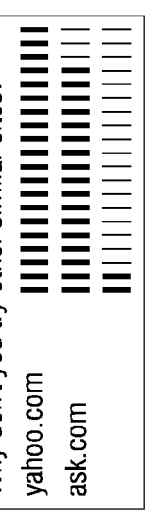
Figure 7:
Figure 7:
Figure 7:
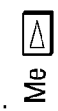
Figure 7:
Figure 7:
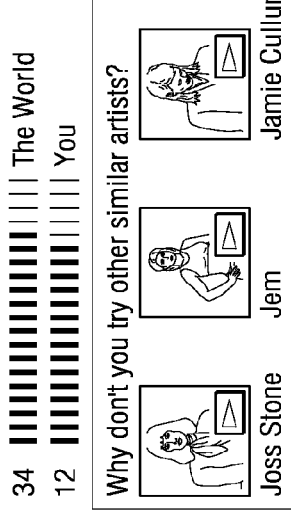

FIG. 7 is a screen view depicting a configuration view 700 in accordance with an example embodiment of the invention. In an example embodiment, configuration view 700 is displayed by an electronic device, such as electronic device 405.

In an example embodiment, the configuration view 700 depicts an expanded view 705 with additional detail 715 and a comparison view 715. The configuration view 700 provides a user with additional detail of the current activity data use in the expanded view 705 and additional detail. Further, suggestions, such as suggestions 605, 610, 615 are displayed in the comparison view 715. In such a case, the user may accept any of the suggestions by employing example embodiments of the invention.

Without in any way limiting the scope, interpretation, or application of the claims appearing below, a technical effect of one or more of the example embodiments disclosed herein is managing contextual relationship of people related to activity data. Another technical effect of one or more of the example embodiments disclosed herein is allowing acceptance of a suggestion to join at least one group.

Embodiments of the present invention may be implemented in software, hardware, application logic or a combination of software, hardware and application logic. The software, application logic and/or hardware may reside on a computer or an electronic device. If desired, part of the software, application logic and/or hardware may reside on a computer and part of the software, application logic and/or hardware may reside on an electronic device. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor and at least one memory including computer program code, the at least one memory and the computer program code configured to, with the at least one processor, cause the apparatus to perform at least the following:
obtain from a user first activity data corresponding to a first activity of a predetermined activity type;
receive from one or more groups second activity data corresponding to the first activity of the predetermined activity type;
indicate difference between the data of the first activity and the data of the second activity; and
present at least one activity data, corresponding to the first activity of the predetermined type,
wherein collaborative filtering patterns, based at least in part on the indicated difference between the data of the first activity and the data of the second activity, are used to present the at least one activity data, and
wherein the at least one activity data is different from both the first activity data and the second activity data.

2. The apparatus of claim 1 wherein each of the first activity data and the second activity data comprises at least one of the following:
contextual recommendations, a mobile number, a name, a short message service contact, a multimedia messaging service contact, an email address, a chat identifier, a location, an Internet protocol address, an Inter service provider, a voice over Internet protocol client, user profile information, media files, music piece, playlist, purchasing habit, position data, one or more shared files, or combination thereof.

3. The apparatus of claim 1 wherein both of the first activity data and the second activity data are at least one of the following: shared, public, anonymous, or private.

4. The apparatus of claim 1 wherein the at least one of the one or more groups is related to a single user having shared or unshared activity data.

5. The apparatus of claim 1 wherein the at least one of the one or more groups is related to multiple users having shared activity data.

6. The apparatus of claim 1 wherein the at least one of the one or more groups is related to each user associated with a service.

7. The apparatus of claim 1 wherein the at least one of the one or more groups is at least one of the following: private, shared, or public.

8. A method, comprising:
obtaining from a user first activity data corresponding to a first activity of a predetermined activity type;
receiving from one or more groups second activity data corresponding to the first activity of the predetermined activity type;
indicating difference between the data of the first activity and the data of the second activity; and
presenting at least one activity data, corresponding to the first activity of the predetermined type,
wherein collaborative filtering patterns, based at least in part on the indicated difference between the data of the first activity and the data of the second activity, are used to present the at least one activity data, and
wherein the at least one activity data is different from both the first and second activity data.

9. The apparatus of claim 8 wherein each of the first activity data and the second activity data comprises at least one of the following:
contextual recommendations, a mobile number, a name, a short message service contact, a multimedia messaging service contact, an email address, a chat identifier, a location, an Internet protocol address, an Inter service provider, a voice over Internet protocol client, user profile information, media files, music piece, playlist, purchasing habit, position data, one or more shared files, or combination thereof.

10. The method of claim 8 wherein both of the first activity data and the second activity data are at least one of the following: shared, public, anonymous, or private.

11. The method of claim 8 wherein the at least one of the one or more groups is related to a single user having shared or unshared activity data.

12. The method of claim 8 wherein the at least one of the one or more groups is related to multiple users having shared activity data.

13. The method of claim 8 wherein the at least one of the one or more groups is related to each user associated with a service.

14. The method of claim 8 wherein the at least one of the one or more groups is at least one of the following: private, shared, or public.

* * * * *